United States Patent

Sinclair

[15] 3,678,477

[45] July 18, 1972

[54] INFORMATION STORAGE EQUIPMENT

[72] Inventor: William Sinclair, Bramcote, England

[73] Assignee: Ericsson Telephones Limited, Ilford, Essex, England

[22] Filed: Sept. 5, 1969

[21] Appl. No.: 855,525

[30] Foreign Application Priority Data

Sept. 25, 1968 Great Britain ............................45640

[52] U.S. Cl. ..............340/173 R, 235/61.11 A, 235/61.11 B, 235/61.12

[51] Int. Cl. ......................................G11c 17/00, G06k 7/06

[58] Field of Search .....................340/173; 235/61.11, 61.12

[56] References Cited

UNITED STATES PATENTS

| | | | |
|---|---|---|---|
| 3,176,279 | 3/1965 | Lin | 340/174.1 |
| 3,363,837 | 1/1968 | Gassino | 340/173 |
| 3,125,672 | 3/1964 | Kull | 235/61.11 |

*Primary Examiner*—Terrell W. Fears
*Attorney*—Blum, Moscovitz, Friedman & Kaplan

[57] ABSTRACT

A punched card information store in which information is stored on cards as holes punched at selected points of a storage array, the cards being stored vertically in a container having partitions disposed one between each pair of adjacent cards. The partitions and cards are perforated uniformly at points of an idle array and accommodate horizontal rows of sensing balls. The balls of a row are spring-loaded into contact with each other. To read information stored on a card, the relevant card is displaced vertically within the container until the storage array of the card registers with the idle array of the partitions. If a hole is punched at a point of a storage array, displacement of the card does not affect the balls of the row running horizontally through the point concerned. But if there is no hole, adjacent balls of the row become separated by the thickness of the displaced card. Ball separation is sensed at the springs, affording a sensed pattern that is the inverse of the storage pattern punched on the displaced card.

7 Claims, 11 Drawing Figures

By

INFORMATION STORAGE EQUIPMENT

This invention relates to information storage and sensing equipment, and is particularly concerned with the use of each equipment at telecommunication stations.

It is known to store information on a card by perforating the card at selected ones of a coordinate array of storage points, selection being made in accordance with a storage code. To read information stored in this way, a sensing head is used comprising a sensing device corresponding to each storage point, the sending devices being disposed in an array identical to that of the storage points. A sensing device comprises a pair of co-operating sensing members spring biased into contact with each other. Perforated cards are placed in the sensing head one at a time. On insertion, the edge of the card separates from each other the sensing members of all the sensing devices. Insertion continues until the array of storage points on the card coincides with the array of sensing devices. When the coincidence occurs, the sensing members of those sensing devices which correspond to perforated storage points resume contact with each other through the relevant perforation; the sensing members of the other sensing devices remain separated from each other by the card. Thus the pattern of perforations in the storage array is reproduced in the array of sensing devices as a corresponding pattern of sensing devices whose sensing members are in contact with each other. Associated with each sensing device is a detector, of suitable electrical or mechanical construction, which indicates whether the sensing members of an associated device are or are not in contact.

Although perforated cards are cheap and up-dating of information is simple — involving merely the replacement of an old by a new card — their use at telecommunication stations has not proved convenient. This is because of the need to keep the cards in a card store and to withdraw a card as required for insertion into the sensing head. Accordingly information stores have been designed for use at telecommunication stations employing storage media such as electrical strap connections, magnetic tape or magnetic cores. These stores comprise a push button for each number stored, and a stored number is sensed and transmitted to line merely by operating the appropriate push button. However these stores are expensive, and up-dating of information is not easy.

According to the invention there is provided information storage and sensing equipment comprising a container containing a number of storage cards on each of which information is stored in the form of perforations, each card being movable within the container from a first or idle position to a second or sensing position at which information stored on a moved card is sensed.

The invention will now be described with reference to the accompanying drawings which, it should be noted, are not to scale and are explanatory only, and in which.

Figure 5B:
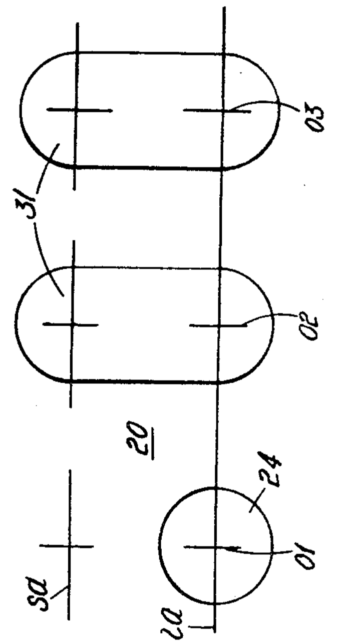
Figure 5A:
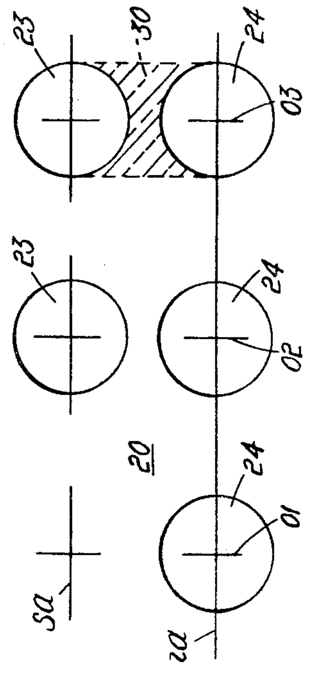
Figures 4A, 4B, 4C:
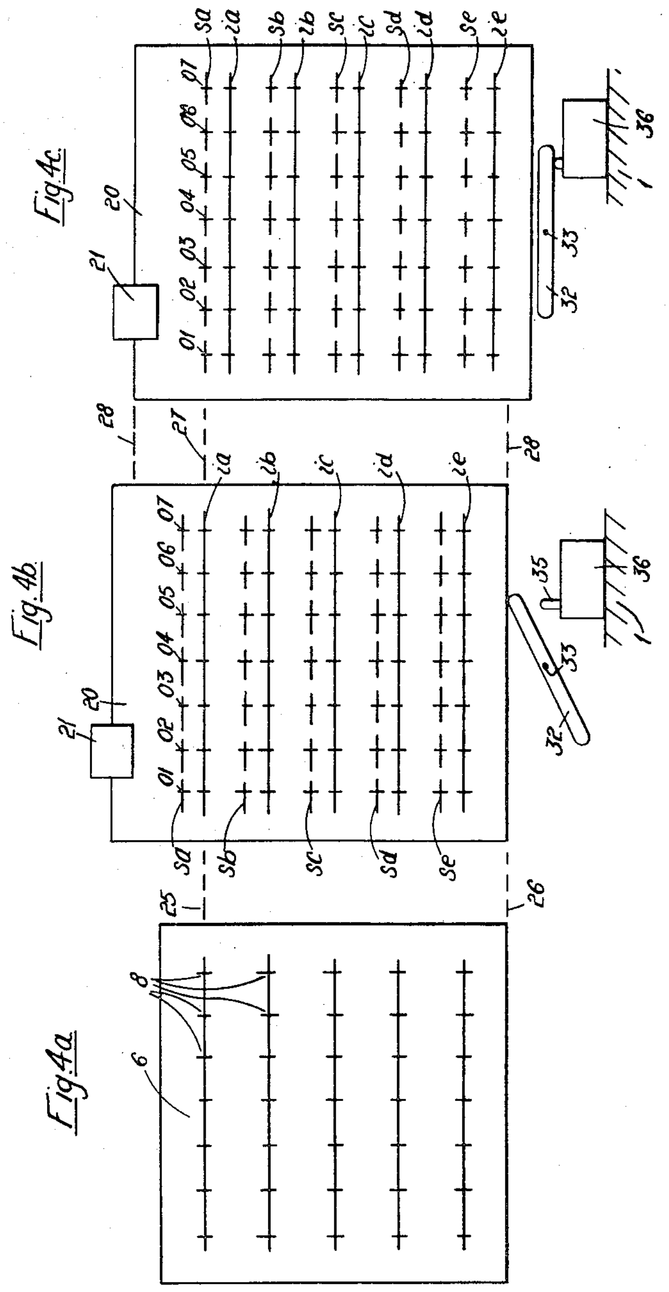

FIGS. 4*a*, 4*b*, 4*c* shows storage and idle arrays and their relationship,

FIGS. 5*a*, 5*b*, show storage and idle perforations in detail and

Figures 6A, 6B, 6C:
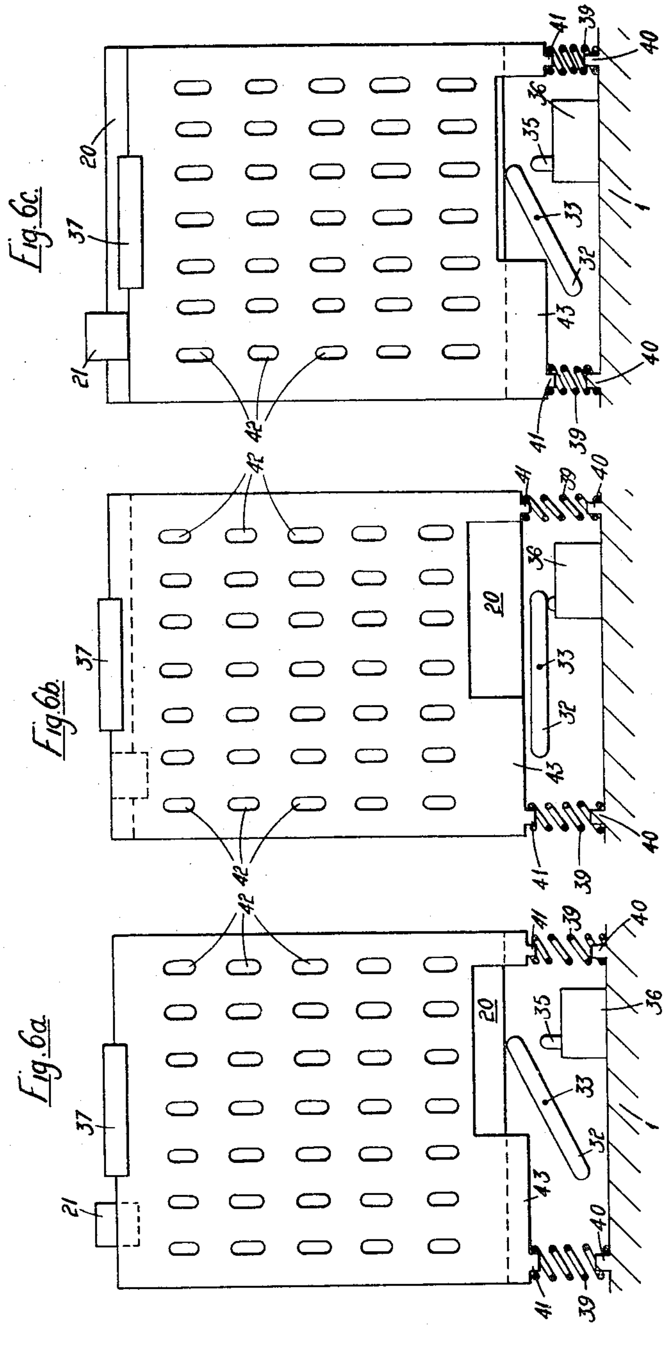

FIGS. 6*a*, 6*b*, 6*c* show means for restoring a card from the sensing to the idle position.

The equipment comprises a trough having a floor 1, walls 2, 3 and a closed end 4. The inside faces of the walls 2, 3 have a number of buttresses 5 whose lateral surfaces are inclined to each other. The buttresses 5 accommodate partitions 6 which lie across the trough parallel to the closed end 4, the inclined surfaces of adjacent buttresses serving to position a partition midway between the buttresses. If desired the partitions may be secured in position by acoustic welding. Each partition is pierced by an array of holes 7 (FIGS. 2,3) whose centers are shown at 8 (FIG. 4*a*). The number of holes 7 and their spacing is identical with that of the storage points in a storage array to be considered later, with that of the storage points in a storage array to be considered later, and the partitions 6 are positioned with corresponding holes 7 in register. Each hole 7 accommodates a ball 9 of such a size as to touch the ball accommodated in the registering hole in a neighboring partition 6. Thus a line of touching balls 9 is formed for each hole of the array. Buffers 10 loaded by springs 11 at one end of a line and buffers 12 loaded by springs 13 at the other end of the line keep the balls 9 of the line in contact with one another. The springs 11 locate on studs 14 in the end 4, and the springs 13 locate on studs 15 in a closure 16 held near the open ends of the walls 2, 3 in a similar way to a partition 6.

Adjacent to this closure 16 and also held similarly to a partition 6, is a laminate 17 which is pierced to allow the necks 18 of the buffers 12 to pass through the laminate. A collar 19 suitably secured to a neck 18 near the free end of the neck acts as a base which enables the relevant spring 13 to offer firm support to the relevant buffer 12. The laminate 17 carries printed electrical circuitry or an equivalent thereof, as will be discussed later.

Figure 1:
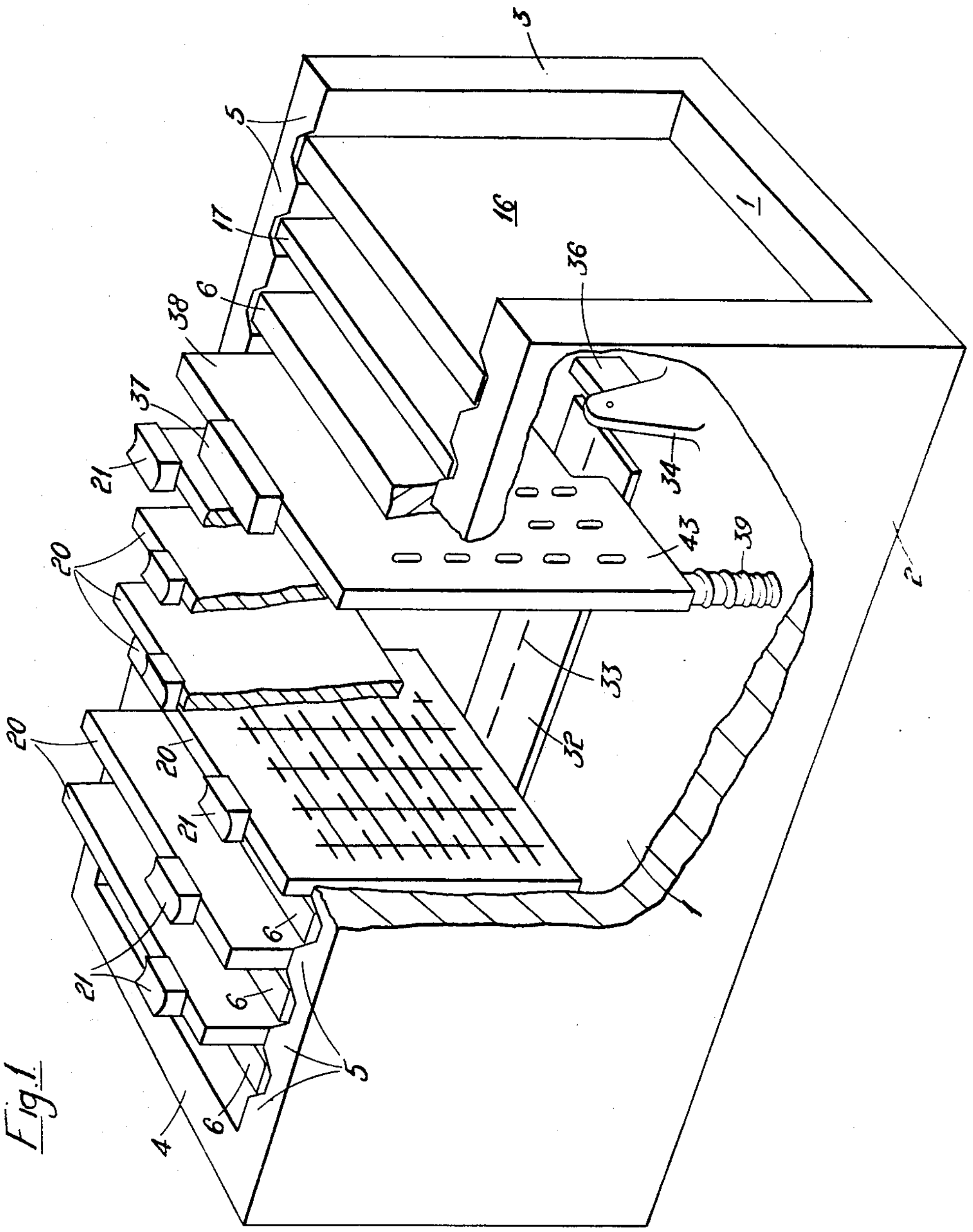
FIG. 1 is a general view, partly sectioned, of information storage and sensing equipment according to the invention.

Cards 20 are accommodated, each between a pair of neighboring partitions 6. As shown most clearly in FIGS. 1, 6, a card 20 is free to move in response to pressure on a push button 21 secured, e.g. by a clip 22, to the card. Movement takes place from an upper or idle position to a lower or sensing position. As indicated in FIG. 1 and as will be discussed in connection with FIGS. **4*b*, 4*c*, 5*a*, 5*b*, a card 20 carries, in known fashion, a co-ordinate array of storage points, at each of which a bit of information may be stored in the form of a perforation such as 23 (FIG. 5*a***). In the present example the storage array comprises five rows *sa*, *ab*, *sc*, *sd*, *se* of storage points arranged in seven columns 01 - 07. All the storage points of the storage array are shown in FIGS. **4*b*, 4*c* and some appear in FIG. 1, but the perforation 23 is shown only in FIG. 5*a*. As mentioned earlier, the number of storage points in the storage array and their spacing is the same as the number and spacing of centers 8 (FIG. 4*a*) of the holes 7 in the partitions 6. Each card 20** also carries a co-ordinate array of idle points equal in number and spacing to the storage points, the rows *ia*, *ib*, *ic*, *id*, *ie*, of the idle array being displaced relatively to the rows of the storage array. Each card 20 is perforated at each idle point of the idle array as indicated by the perforations 24 in FIGS. **5*a*, 5*b***.

Figure 2:
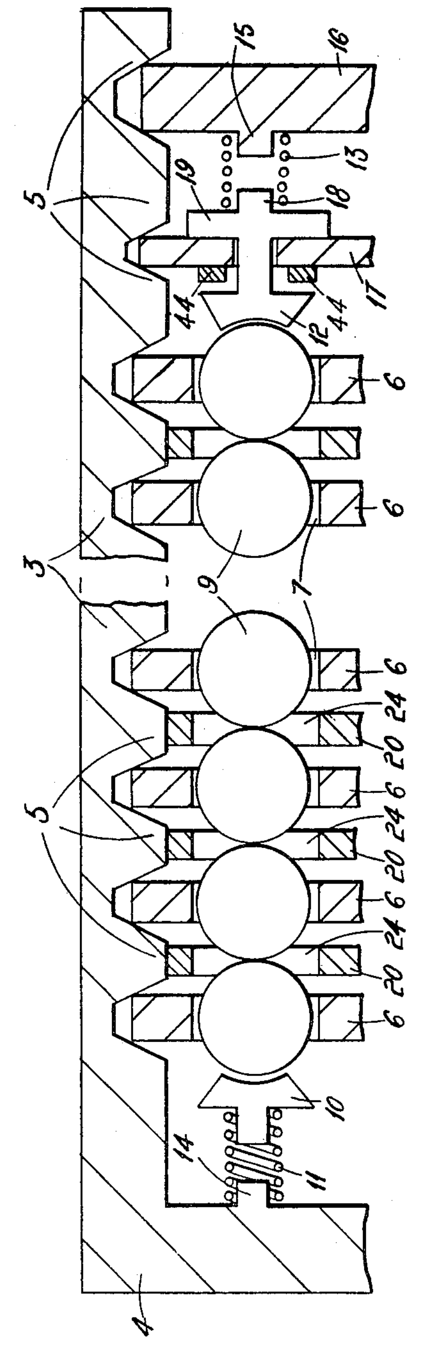
FIG. 2 is a partial plan view, in section, of the equipment of FIG. 1
Figure 3:
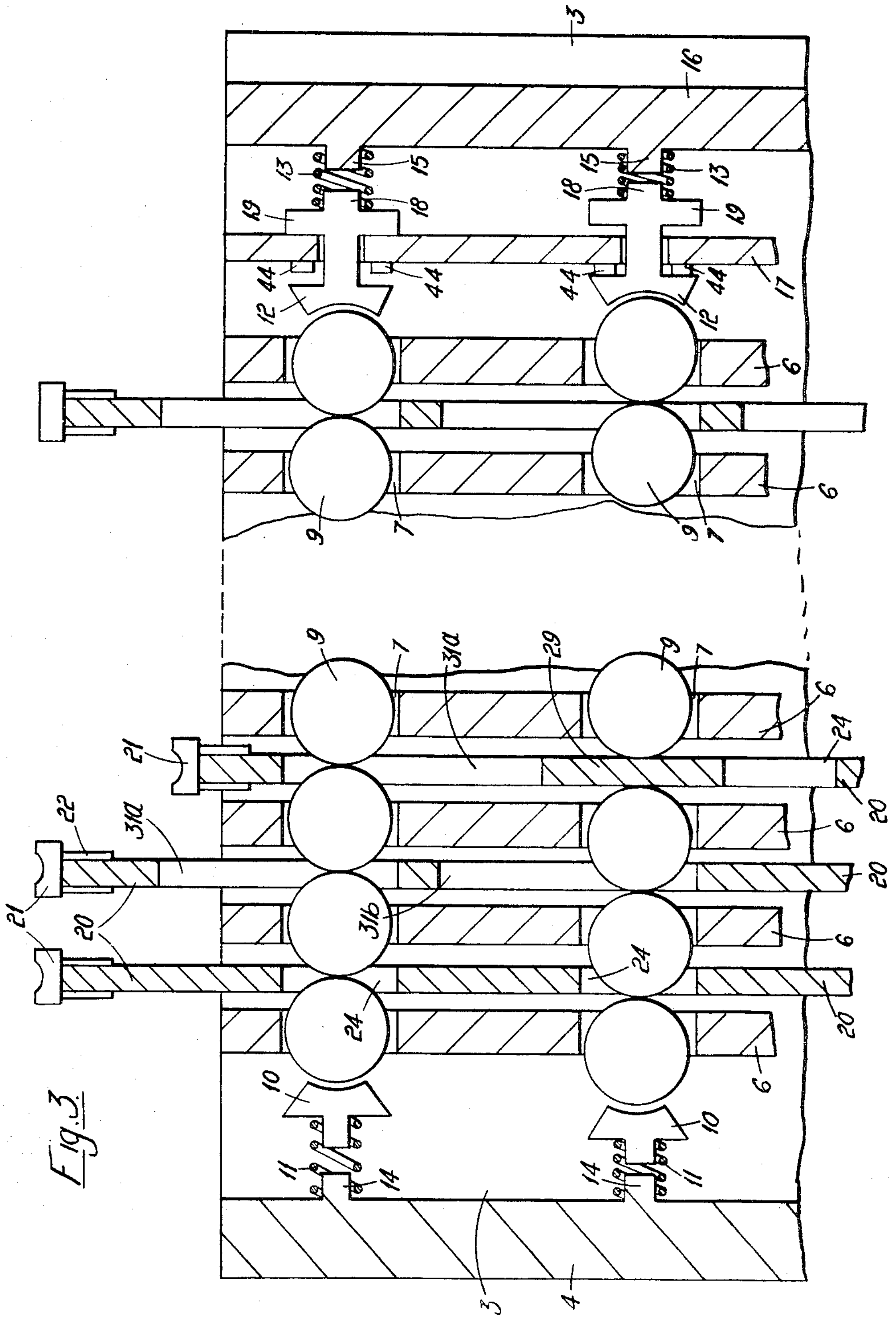
FIG. 3 is a partial side elevation, in section, of the equipment of FIG. 1.

In the normal or storage position, a card 20 has its idle perforations 24 in register with the holes 7 in the partitions 6, the holes being represented in FIG. **4*a* by their centers 8. The broken line 25 between FIGS. 4*a*, 4*b* illustrates this point. As shown in FIGS. 2, 3 neighboring balls 9 of a line make contact with each other through a perforation 24. In the storage position of a card 20, the bottom of the card 20 is flush with the bottom of the partitions 6, as indicated by the broken line 26 between FIGS. 4*a*, 4*b***.

To move a card 20 into the sensing position, the relevant push button 21 is pressed downwardly. The card 20 moves until the storage array registers with the centers 8 on the partitions 6, as indicated by the broken line 27 between FIGS. **4*b*, 4*c*, and the broken line 25 between FIGS. 4*a*, 4*b*. The movement of the card 20 is also represented by the broken lines 28 between FIGS. 4*b*, 4*c*, and it will be noted that, in the sensing position, the bottom of a card 20 stands proud of the bottoms of the partitions 6**.

When a card 20 is in the sensing position, neighboring balls 9 of a line touch each other through a storage perforation 23 where a storage perforation is present, in the manner already described for an idle perforation 24. Where no storage perforation is present, neighboring balls 9 are separated from each other by the thickness of the card 20 as shown at 29 in FIG. 3 The separation of the neighboring balls is passed by the other balls of the line to the buffers 10, 12 whose springs 11, 13 are compressed to accommodate the movement. This is shown in the lower part of FIG. 3. The travel of the buffers 10, 12 is limited to that necessary to accommodate the thickness of one card, so that only one card 20 can be in the sensing position at any one time. Considering all the buffers 12 as an array, it will be apparent that by moving a card 20 into the sensing position the pattern of storage perforations on the moved card re-appears as a pattern of moved buffers 12. Each buffer 12 therefore serves as a detector for a storage point of the storage array. A detector or buffer 12 may be used to control electrical or mechanical devices as will be discussed later. At this stage it is desirable to consider in greater detail the movement of a card 20 from the storage to the sensing position, as well as its return to the storage position. Referring particularly to FIGS. *5a*, *5b*, when a card 20 is in the storage position, neighboring balls 9 of a line touch each other through an idle perforation 24. When the card is moved, the neighboring balls of each line are separated from each other, contact being resumed in those cases where a storage perforation 23 is present. Where a storage perforation 23 is present the initial separation of the neighboring balls is redundant, and can be eliminated by cutting away the isthmus shown shaded at 30 (FIG. *5a*) between a storage perforation 23 and the idle perforation 24, corresponding thereto. This cutting away results in slots 31 as shown in FIGS. *5b*. In FIG. 3 the slots 31 relative to the upper row of balls 9 are given the suffix *a* and those relating to the lower row the suffix *b*.

A bar 32, pivoted about a pivotal axis 33, (FIGS. 1, *4b*, *4c*, *6a*, *6b*, *6c*) runs underneath the cards 20, being supported from the floor 1 by a pair of stanchions, one of which is shown at 34 in FIG. 1. The bar 32 is suitably biased, e.g. by a weight or spring, so as normally to occupy a titled position in which its upper edge engages the bottoms of the cards 20 and supports them in the storage position, as shown in FIGS. *4b*, *6a*, *6c*. When a card 20 is moved into the sensing position, the bottom of the moved card pivots the bar 32 from its tilted position to one in which the full width of the bar engages the moved card as shown in FIGS. 1, *4c*, *6b*. During its privotal movement, the bar 32 engages the plunger 35 of a microswitch 36, operating the switch with results which will be discussed later.

To restore a moved card 20 to its storage position, a common restore button 37 is operated. The restore button 37 is carried by a restore card 38 which is supported by springs 39 engaging locating studs 40, 41 on the floor 1 and the card 38 respectively, see particularly FIGS. *6a*, *6b*, *6c*. To allow the restore card 38 to be moved when a card 20 is in the sensing position, the restore card 38 has slots identical to the slots 31, at each point of the array. These slots are indicated in FIG. 1 and are shown more fully at 42 in FIGS. *6a*, *6b*, *6c*. On account of these slots 42, the restore card 38 can be moved without moving any of the balls 9 or any of the buffers 12. The bottom of the restore card 38 has a depending lug 43. When the restore card 38 is moved against the action of the springs 39, the lug 43 strikes the bar 32 and returns the bar to its original tilted position, the return of the bar 32 lifting the moved card 20 back into the storage position, as shown in FIG. *6c*. When the moved card 20 has been returned to the storage position, pressure is removed from the restore button 37. The springs 39 then cause the restore card 38 to return to its original position as shown in FIG. 6 *a*.

As stated above, the buffers 12 serve as detectors and may be used to operate electrical or mechanical devices as required. When the storage and sensing equipment is used at a telecommunication station the control of electrical devices is the more suitable arrangement. With this arrangement, it is convenient if the laminate 17 (FIGS. 1, 2, 3) is a printed circuit (or equivalent) board on which devices to be controlled are mounted. The circuits have lands 44 with which the buffers 12 can make physical and electrical contact. Different circuit and contact arrangements are possible. Thus two lands 44, bridged by a moved buffer 12, as shown in the lower part of FIG. 3, may be connected in series with each other, the moved buffer 12 serving to carry current from one land 44 to the other. Alternatively the lands 44 may be on the other face of the laminate 17, and may normally be in contact with each other by the bridging action of the collar 19. In this case movement of the buffer 12 causes the collar 19 to operate with an electrical break action. As a further alternative electrical power may be supplied to the lands 44 from the buffer 10 by way of the line of balls 9 and the collar 19 of the buffer 12. In this case the break action of the collar 19 is supplemented by that of the moved card 20 if the thickness 29 is electrically insulating. The choice of material for the balls 9, buffers 10, 12 and collars 19 and cards 20 must therefore be resolved with reference to the electrical arrangements to be used.

It is known to store the digits of a wanted number in binary code, and circuits are known by which the stored digits may be transmitted to line on the operation of a send switch. Conveniently, suitable ones of these circuits are carried by the laminate 17. When a card 20 is moved to its sensing position, its storage pattern reappears at the buffers 12 and is therefore available for used in the circuits mentioned. The microswitch 36, which is operated by the moved card, serves as a send switch, and the stored information is transmitted to line. When the user hears ring tone, he knows that the wanted number is being called. He then operates the restore button 37 which restores the moved card 20 and releases the microswitch 36.

When a card 20 is in the storage position, neighboring balls 9 touch each other through the idle perforations 24, as already explained. When the information on a card 20 becomes obsolete, the affected card is withdrawn upwardly (see particularly FIGS. 1, 3). When the card has been withdrawn, neighboring balls 9 are again in contact with each other. Thus the functioning of the equipment is unimpaired by the withdrawal of the obsolete card. When a new card has been perforated with the revised information, the new card is inserted in the place vacated by the obsolete card.

It was stated at the beginning that the drawings are explanatory and are not to scale. In one practical equipment the storage array comprises four rows and 20 columns. The four rows enable the decimal digits 0–9 to be stored in binary code, and the 20 columns enable each card to store a 20-digit telephone number. Hence, if the equipment is installed at a telecommunications station, it can be used to store a repertory of telephone numbers, each of which may consist of as many as 20 digits. 35 of these cards are accommodated in a container measuring approximately 7 inches long, 6¼ inches wide & 4¼ inches high externally. The balls 9 are 3 mm in diameter centered at 0.175 inch spacing horizontally and 0.375 inch vertically. The push buttons 21, 27 are carried on their cards by stems which pass through holes in a dust cover closing the through 1. The cards 20 are not of uniform thickness, having stiffeners of increased thickness between adjacent columns of the array, i.e. at those parts of the card which are not traversed by the balls 9. If the equipment is installed at a telecommunications station, the circuits printed on the laminate 17 may conform to the disclosure in our British Specification No. 1,093,194. Each card 20 corresponds to a key KD of the specification mentioned, and the storage perforations correspond to the straps shown by broken lines in FIG. 1 of the Specification. The microswitch 36 serves as a common send switch for all the cards 20, and performs the function of the start contact KD 11 of the specification. By making a detector as a combination of a buffer 12 and a collar 19 engaging lands 44 on the printed circuit laminate 17, it is possible to space the detectors so that they register with the holes 7 in the partitions 6. This arrangement would have been difficult if not impossible, if leaf springs were used to load the buffers.

What we claim is:

1. Information storage and sensing equipment comprising a plurality of storage cards on each of which information is stored in the form of perforations at selected cross points of a coordinate storage array, each of said cards being formed with further idle perforations at all the cross points of an idle array identical with said storage array but displaced relative thereto; a container for receiving said storage cards in spaced substantially overlapping relation; means within said container for permitting the selective displacement of selected ones of said cards within the container from a first or idle position to a second or sensing position, each of said storage cards being positioned at said idle position with their respective idle perforations in substantial alignment, said sensing position of said storage cards being selected so that the storage array of the displaced card is in substantial alignment with the idle array of the other of said cards; and sensing means for sensing the information stored on a displaced card when said card is in said sensing position, said sensing means being positioned in substantial alignment with said idle arrays of said storage cards when said cards are in said idle position, and being adapted to detect whether a perforation is present at each cross point of the storage array of a card displaced into said sensing position.

2. Information storage and sensing equipment as recited in claim 1, wherein said sensing means includes a series of spaced substantially parallel partitions each being formed with holes therethrough disposed in an array identical with said idle array, one of said partitions being positioned in the space intermediate each adjacent pair of said storage cards with the holes therethrough in substantial alignment with the idle arrays of said cards when said cards are in said idle position, a ball positioned in each hole of each partition, the balls positioned at each cross point of said idle array together forming a line of registering balls, bias means for biasing neighboring balls of a line into mutual contact, and detector means for each line of balls operable when contact between any pair of neighboring balls in a line is interrupted, whereby said detector means is operable in response to the absence of a perforation at a selected cross point of the storage array of a card displaced from said idle position to said sensing position so that the storage pattern of a displaced card is reproduced as a corresponding pattern of unoperated detector means.

3. Information storage sensing equipment as recited in claim 2, wherein said bias means includes a bias spring positioned at each end of each line of balls.

4. Information storage and sensing equipment as recited in claim 2, including printed circuit board means positioned adjacent said detector means, said printed circuit board bearing electric circuits including a plurality of contacts, one of said contacts being positioned for control by each of said detector means; said information storage and sensing equipment including a common send switch means responsive to the movement of any card from said idle to said sensing position to energize said circuits.

5. Information storage and sensing equipment as recited in claim 4, wherein said common send switch means includes a send switch operating bar extending transversely to said storage cards and pivotably mounted in said container in the path of displacement of said storage cards from said idle to said sensing position, and a send switch, said send switch operating as normally occupying a position in which said send switch is operated and being pivotable in response to the movement of a card from said idle to said sensing position for engaging and operating the send switch during its pivotable movement.

6. Information storage and sensing equipment as claimed in claim 5, including a restore member; means for mounting said restore member in a plane parallel to said storage cards in said container for displacement between first and second positions, said restore member having an array of slots therethrough positioned for registration with the idle array of said storage cards when said cards are in said idle position and said restore member is at its first and second positions and during the displacement thereof therebetween, said restore card having a lug projecting therefrom for engagement with said send switch operating bar to restore said bar to its normal position in response to the displacement of said restore member.

7. Information storage and sensing equipment as recited in claim 6, including means for normally biasing said restore member to said normal position.

* * * * *